UNITED STATES PATENT OFFICE.

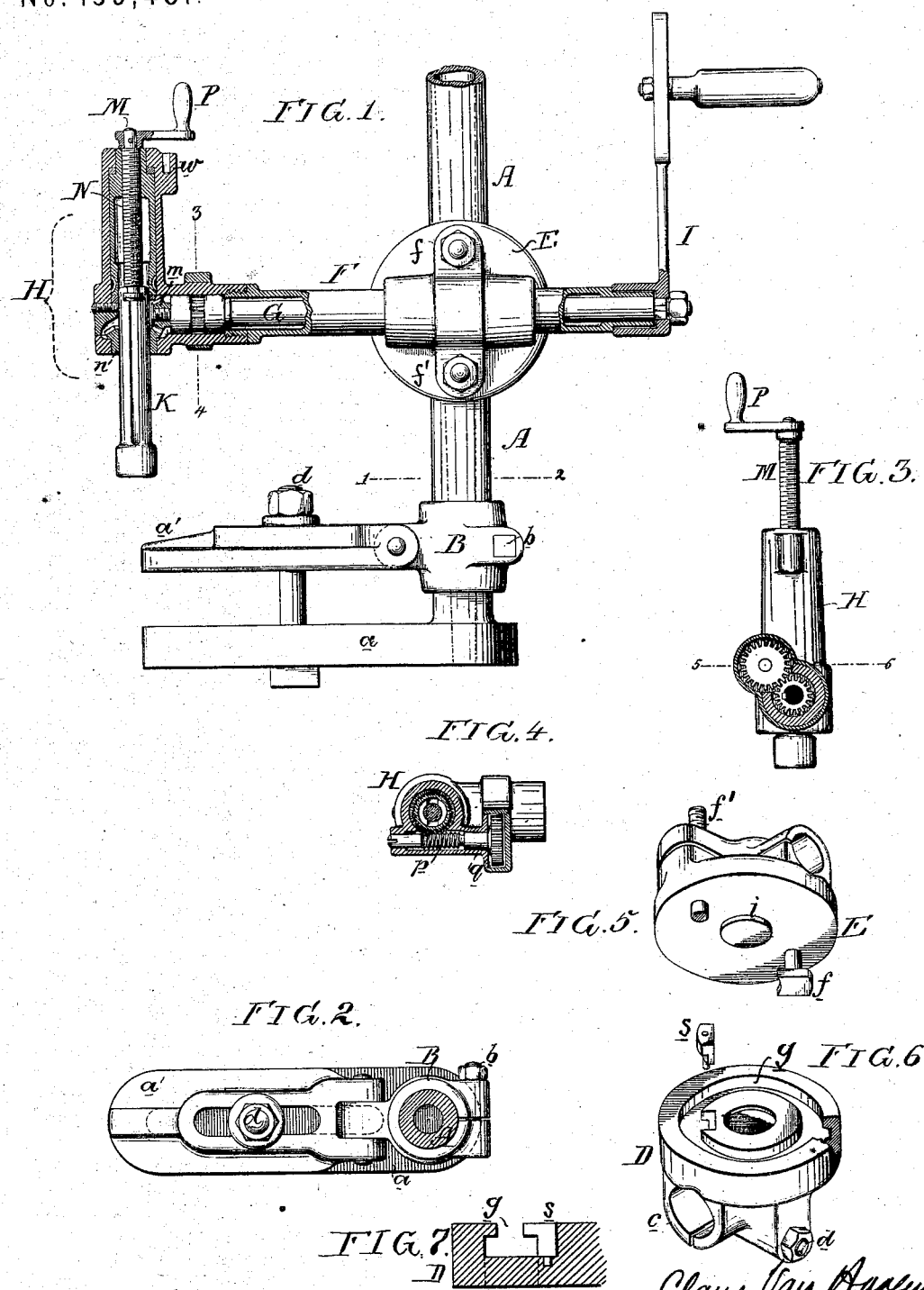

CLAUS VAN HAAGEN, OF PHILADELPHIA, PENNSYLVANIA, ASSIGNOR TO HIMSELF AND ANTHONY VAN HAAGEN, OF SAME PLACE.

IMPROVEMENT IN METAL-DRILLING MACHINES.

Specification forming part of Letters Patent No. 159,481, dated February 2, 1875; application filed June 1, 1874.

*To all whom it may concern:*

Be it known that I, CLAUS VAN HAAGEN, of Philadelphia, Pennsylvania, have invented certain Improvements in Drilling-Machines, of which the following is a specification:

My invention relates to portable drilling-machines; and has for its objects the ready and secure attachment of the drill-stand to any desired fixed objects, the easy adjustment of the drill-spindle to any position which circumstances may require, and the simple construction of mechanism for rotating and feeding the said drill-spindle. These objects I attain in the manner which I will now proceed to describe, reference being had to the accompanying drawing, in which—

Figure 1 is a side view, partly in section, of my improved portable drilling-machine; Fig. 2, a sectional plan on the line 1 2, Fig. 1; Fig. 3, a vertical section on the line 3 4, Fig. 1; Fig. 4, a sectional plan on the line 5 6, Fig. 3, and Figs. 5 and 6 detached perspective views of parts of the mechanism.

The frame or stand of the drilling-machine consists of a cylindrical post, A, having a foot or base, $a$, the post being embraced by a collar, B, which is split at the rear, as shown in Fig. 2, and the severed portions of which are connected together by a bolt, $b$, so that, on tightening the latter, the said collar will be securely clamped to the post. To a lug in front of the collar is hinged a clamping-plate, $a'$, slotted longitudinally to receive a bolt, $d$, which also passes through a longitudinal slot in the foot $a$. In securing the stand to any object, the collar B should be vertically adjusted until the plate $a'$, when in a horizontal position, is at a distance from the foot $a$ equal, or nearly so, to the thickness of the object to which the stand has to be clamped, so that, when adjusted to this object, and the plate $a'$ is tightened by the bolt $d$, the said plate may bear uniformly on the surface, and thus insure a firm hold on the said object. The clamping-collar B affords every facility for this vertical adjustment of the clamping-plate $a'$, and also permits this plate to be moved laterally out of the way whenever circumstances demand the bolting of the foot to any object. To the post is also adapted a clamping-disk, D, (best observed in the perspective view in Fig. 6,) the portion $c$ of this disk being severed, so that, by means of a bolt, it may be made to gripe the post by tightening the nut $d$, on loosening which, however, the disk may be adjusted to any desired position on the said post. The disk D has an undercut annular groove for the reception of the heads of the bolts $ff'$, which pass through the disk E, the said bolt-heads being free to traverse this groove. This disk E has a central circular projection, $i$, adapted to a central opening in the disk D, so that when the two are fitted together the disk E can be turned to any desired position on the disk D, but it is incapable of any other independent movement. On the disk E, a front view of which appears in Fig. 1, is formed a collar or clamp, severed, in the same manner as those heretofore described, so that it can be secured to the tubular rod F by tightening the bolt $f'$; or may be released by loosening the bolt, thereby permitting the said rod to be adjusted to any desired position longitudinally.

It may be observed that the bolt $f$ serves to secure the two disks E and D together, and that the bolt $f'$ serves the same purpose, and also to clamp the disk E to the above-mentioned tubular bar F, which can be moved in either of the two vertical planes, at right angles to each other, to any desired position, may be turned laterally on the stand, and can be adjusted vertically on the same. In other words, the two disks E and D, with their clamping-collars, constitute a species of universal joint for connecting the post of the stand to the tubular bar F.

It has been usual heretofore in forming undercut grooves for the reception of bolt-heads—such, for instance, as the annular groove $g$ in the disk D—to cut away the metal at one point, so as to permit the introduction and withdrawal of the said bolt-heads. In the present instance, however, one of the bolts, $f'$, is relied on to clamp the disk E to the tubular bar F, as above described; and, if a portion of the metal were cut away, the head of the bolt $f'$ might, under some circumstances, be brought to a position opposite such cut away portion, in which case it would yield, and release the tubular bar F. To prevent this, I adapt a flanged plug, s, Figs. 6 and 7, to the cut portion of the groove, and thus effectually retain the bolt-heads under all circumstances.

To one end of the bar F is secured a casing, H, carrying the drill-spindle and other appliances referred to hereafter, and at the opposite end a handle, I, is secured to the driving-shaft G, which passes through the said bar F, and projects into the casing H, the end of the shaft being furnished with a bevel-pinion, m, gearing into a bevel-wheel, n, which turns in the lower portion of the casing H, and through which passes the drill-spindle K, the latter having a groove adapted to a key or feather in the wheel. The upper end of the drill-spindle is so connected to the lower end of the feed-screw M that while one can turn independently of the other, the vertical movement of one must be accompanied by a like movement of the other. A tubular shaft, N, which receives the drill-spindle, is arranged to turn freely, but is confined vertically within the upper portion of the casing H, the upper portion of this tubular shaft forming the nut for the screw M, and having, near its lower end, teeth adapted to a worm, p, on a spindle, q, which derives its motion from the driving-shaft G, through the medium of the cog-gearing shown in Fig. 3, and, consequently, rotates the tubular shaft, and this, through the medium of the screw M, feeds the drill-spindle, which can also be raised or lowered, by turning the screw itself, by means of a handle, P, the latter being prevented from turning by a pin inserted into a socket, w, when the automatic feeding of the drill spindle is required.

I claim as my invention—

1. The combination, in a drill-stand, of the post A, its foot a, and a clamping-plate, a' hinged to an adjustable collar, B, on the post, all substantially as set forth.

2. The combination of the post A and clamping-disk D with the tubular drill-carrying bar F, and its clamping-disk E, the two disks being secured and otherwise adapted to each other, substantially as and for the purpose set forth.

3. The combination of the movable clamping-disk E, the tubular bar F, and its casing H, the driving-shaft G, and drill-spindle K, operated from the said shaft, all substantially as specified.

4. The combination, substantially as described, of the disk D, its undercut groove and flanged plug s, with the disk E, and headed bolts f and f'.

In testimony whereof I have signed my name to this specification in the presence of two subscribing witnesses.

C. VAN HAAGEN

Witnesses:
WM. A. STEEL,
HARRY SMITH.